May 4, 1965  F. C. MOCK  3,181,520
FUEL INJECTOR SYSTEM WITH SMOG INHIBITING MEANS
Filed July 2, 1962  10 Sheets-Sheet 2

INVENTOR.
FRANK C. MOCK
BY
AGENT

INVENTOR.
FRANK C. MOCK

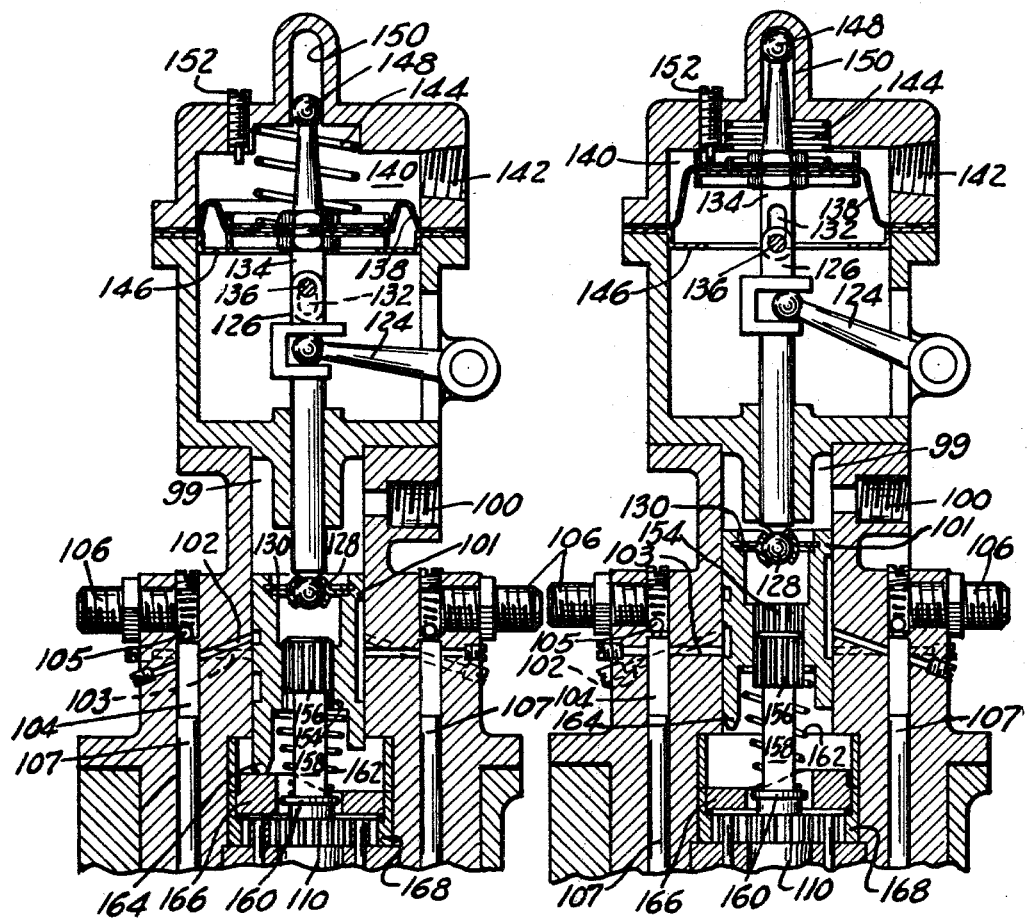

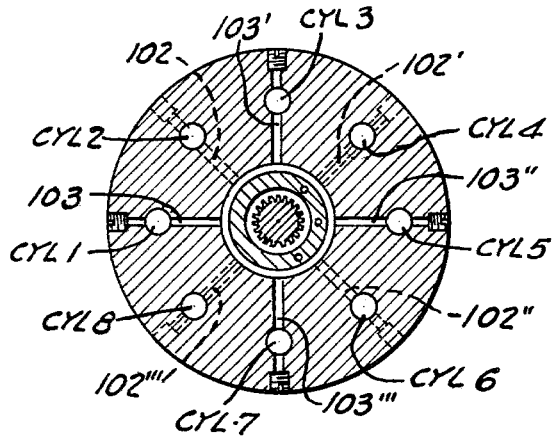
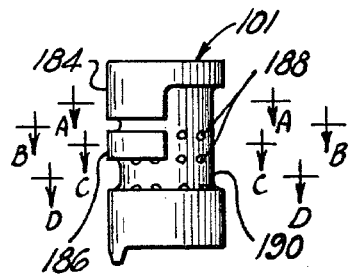
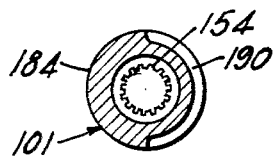 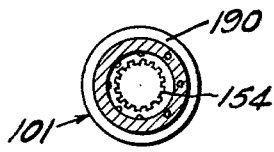 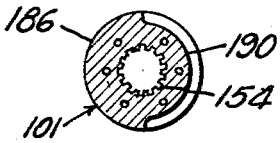
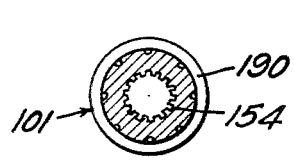 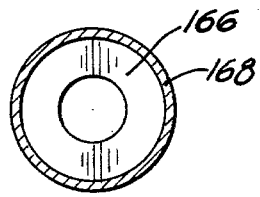 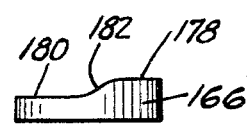

May 4, 1965 F. C. MOCK 3,181,520
FUEL INJECTOR SYSTEM WITH SMOG INHIBITING MEANS
Filed July 2, 1962 10 Sheets-Sheet 6
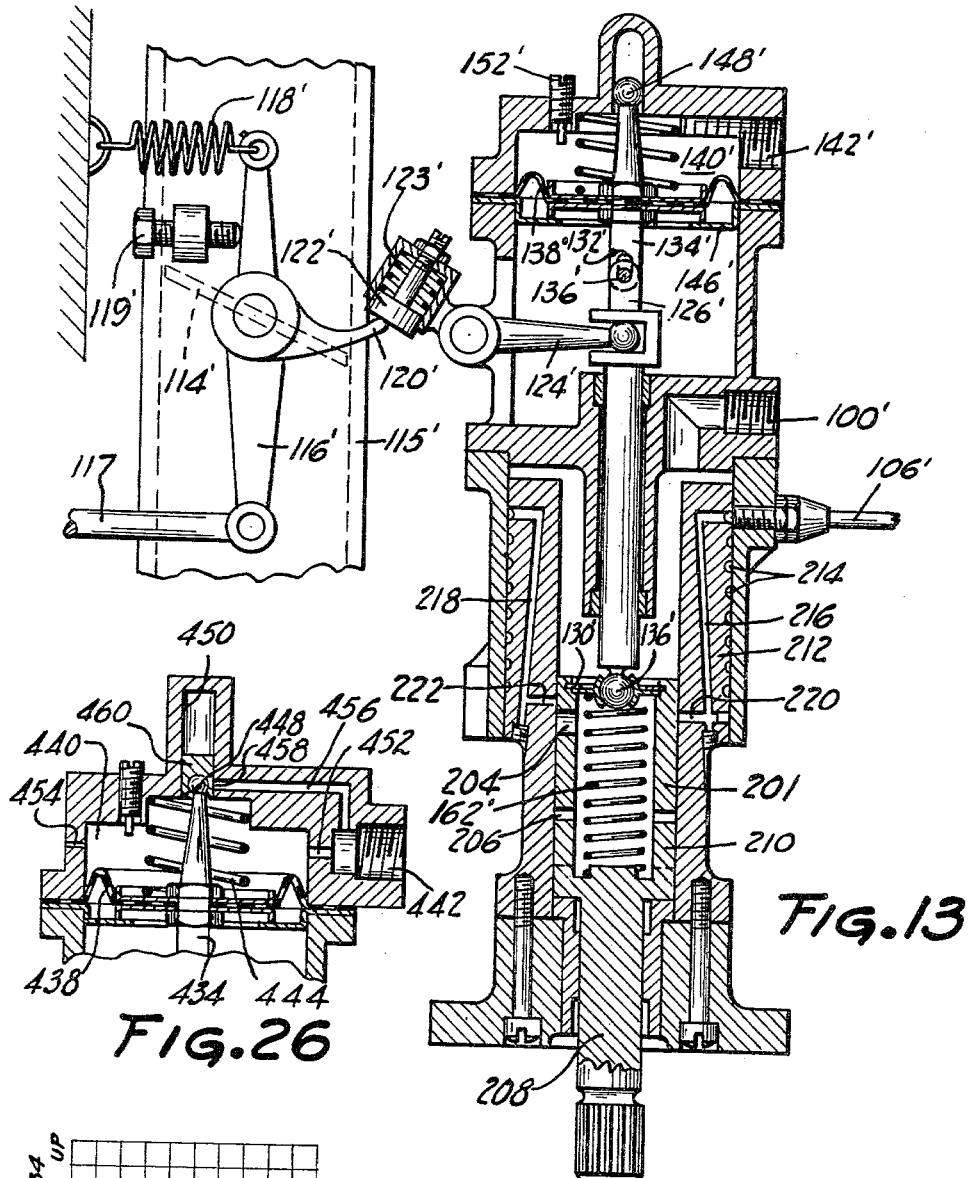
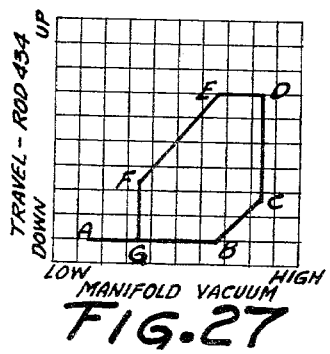
INVENTOR.
FRANK C. MOCK
BY
AGENT May 4, 1965 F. C. MOCK 3,181,520
FUEL INJECTOR SYSTEM WITH SMOG INHIBITING MEANS
Filed July 2, 1962 10 Sheets-Sheet 8
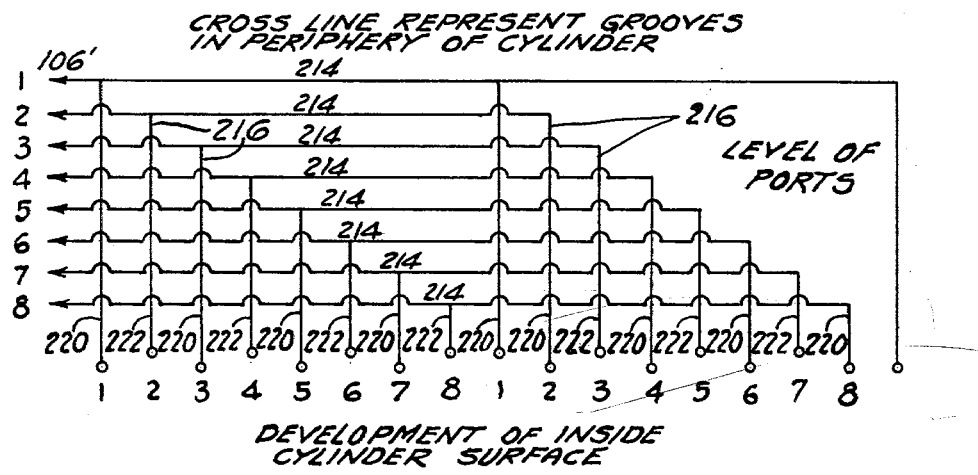
FIG.21
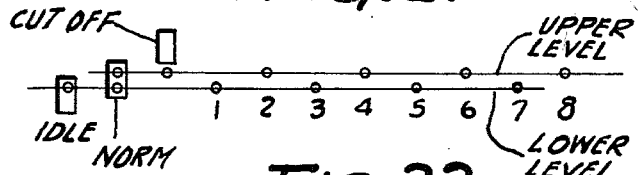
FIG.22
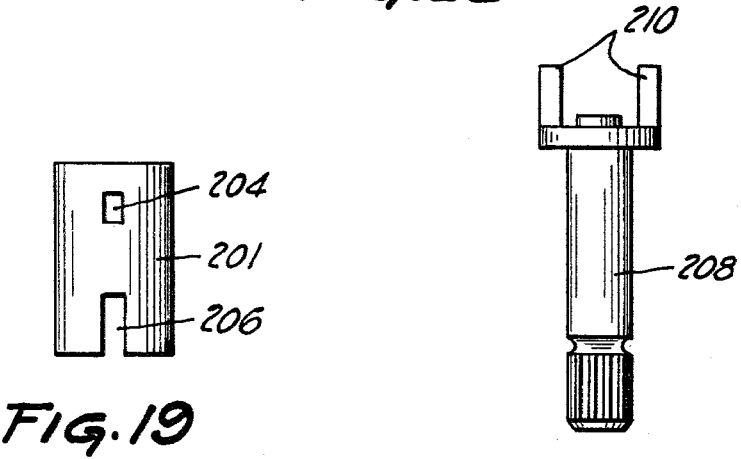
FIG.19
FIG.20
INVENTOR.
FRANK C. MOCK
BY
AGENT May 4, 1965 F. C. MOCK 3,181,520
FUEL INJECTOR SYSTEM WITH SMOG INHIBITING MEANS
Filed July 2, 1962 10 Sheets-Sheet 9
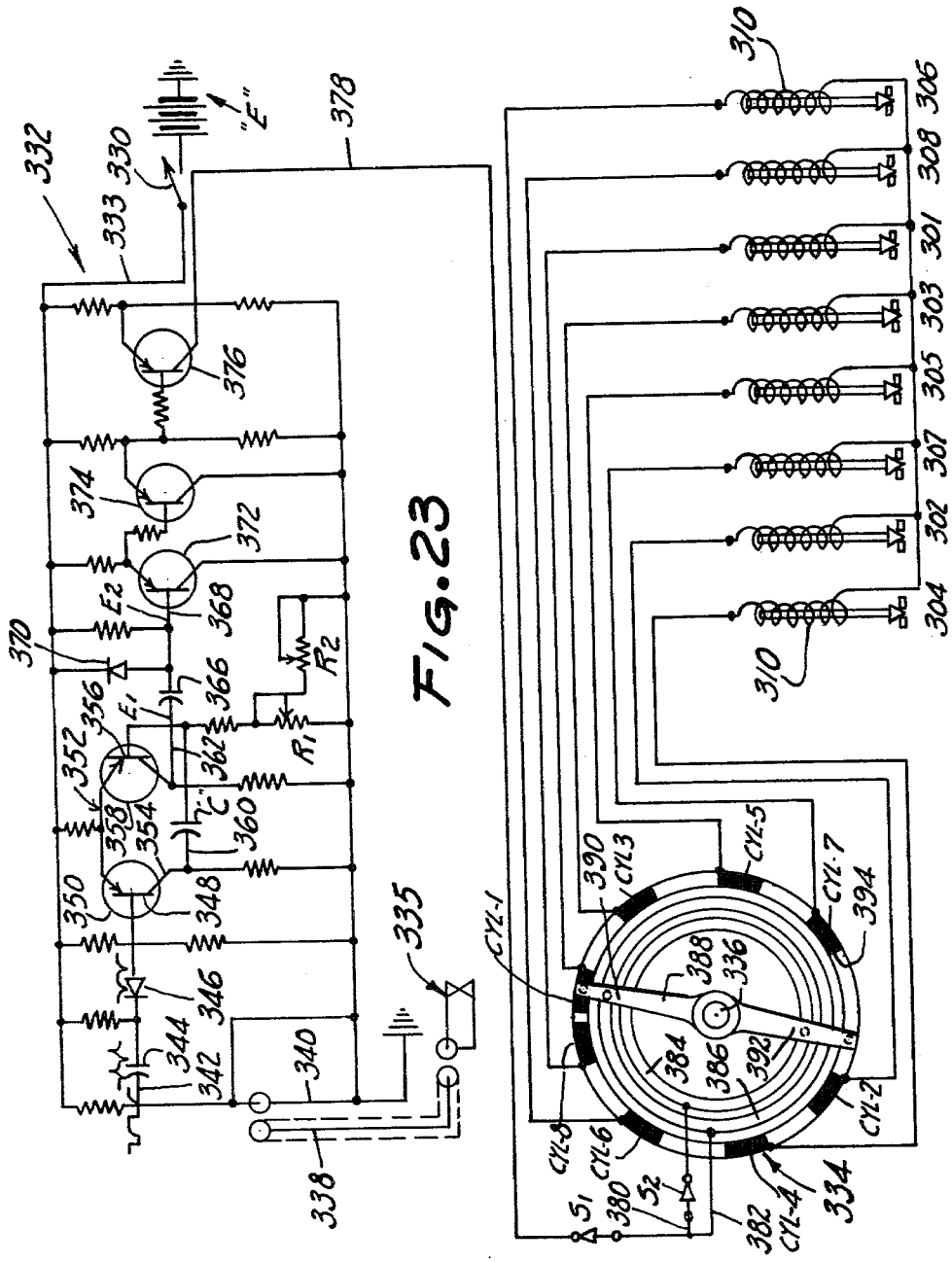
INVENTOR.
FRANK C. MOCK
BY
AGENT May 4, 1965 F. C. MOCK 3,181,520
FUEL INJECTOR SYSTEM WITH SMOG INHIBITING MEANS
Filed July 2, 1962 10 Sheets-Sheet 10

INVENTOR.
FRANK C. MOCK
BY
AGENT

United States Patent Office 3,181,520
Patented May 4, 1965

3,181,520
FUEL INJECTOR SYSTEM WITH SMOG
INHIBITING MEANS
Frank C. Mock, South Bend, Ind., assignor to The Bendix
Corporation, South Bend, Ind., a corporation of
Delaware
Filed July 2, 1962, Ser. No. 206,839
4 Claims. (Cl. 123—139)

The present invention relates to an improvement in fuel injection systems for internal combustion engines including means to prevent or reduce the formation of smog inducing combustion products in the exhaust gases.

It has been found that uncombined hydrocarbons resulting from incomplete combustion are an important agent in the formation of the toxic gas known as "smog." It is also known that the percentages of such hydrocarbons emitted in the exhaust is greater in the deceleration and idle ranges of engine operation than during acceleration and cruise. This effect is due to low charge pressure and greater exhaust gas dilution of the combustion fuel/air charge, resulting in inefficient and incomplete combustion as will be described in greater detail in the body of the specification.

It is an object of my invention to provide an improved fuel injection system having means for maintaining conditions favorable for complete combustion during idle and deceleration ranges of engine operation to prevent the formation of uncombined hydrocarbons.

It is another object of the present invention to provide means with a fuel injection system for establishing alternate cylinder firing, i.e., one firing cycle—one purge cycle, during the idle range of operation to provide for efficient combustion.

It is still a further object of the present invention to provide fuel cut-off means with a fuel injection system operative during a deceleration range of operation to interrupt cylinder firing and prevent the formation of uncombined hydrocarbons during this range of engine operation.

Other objects and advantages of my invention will become readily apparent from the following detailed description taken in conjunction with the appended drawings in which:

FIGURES 7 and 8 are additional section views of the fuel injection system of FIGURE 5 showing different ranges of operation;

FIGURE 9 is a sectional view taken along section line 9—9 of FIGURE 5;

FIGURE 10 is a plan view of a spool valve controlling the metering and distribution by-pass ports of the fuel injection system of FIGURE 5;

FIGURES 10A through 10D are section views of the spool valve of FIGURE 10 taken at section lines A—A, B—B, C—C and D—D, respectively;

FIGURES 11 and 12 are top and side views respectively, of a cam arrangement of the FIGURE 5 embodiment;

FIGURE 13 is a cross-sectional view of a second embodiment of my invention as applied to a fuel distributing device;

Figure 15:
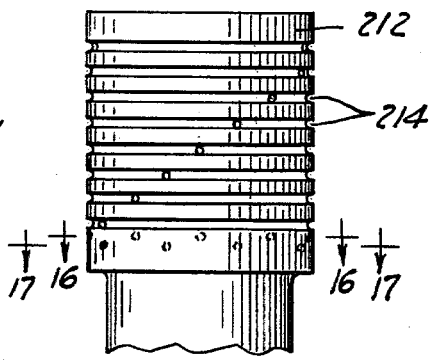
FIGURE 15 is a side view of a spool valve casing of the fuel distributing system of FIGURE 13.
Figure 16:
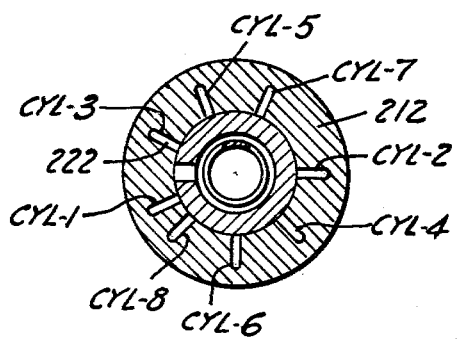
Figure 17:
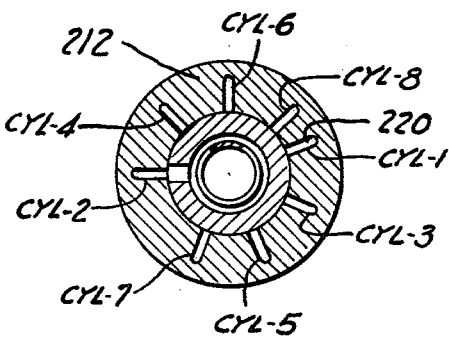
Figure 18:
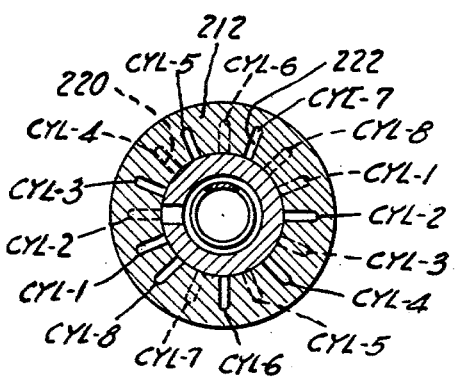

FIGURES 16 and 17 are section views taken along sections 16—16 and 17—17 respectively, of FIGURE 15 showing two planes of fuel distributing ports;

FIGURE 18 is a composite view of the FIGURE 16 and 17 section views illustrating the staggered relationship of fuel distributing ports.

Figure 14:
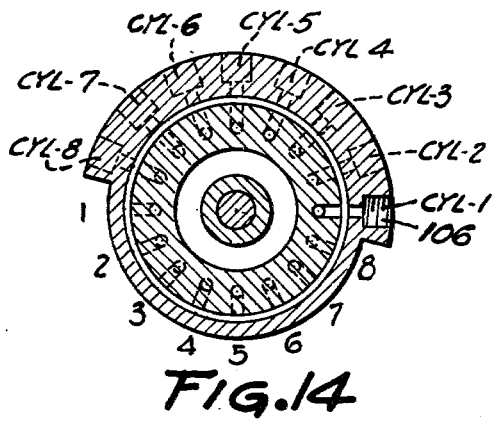
FIGURE 14 is a section view taken along section line 14—14 of FIGURE 13.
Figure 24:
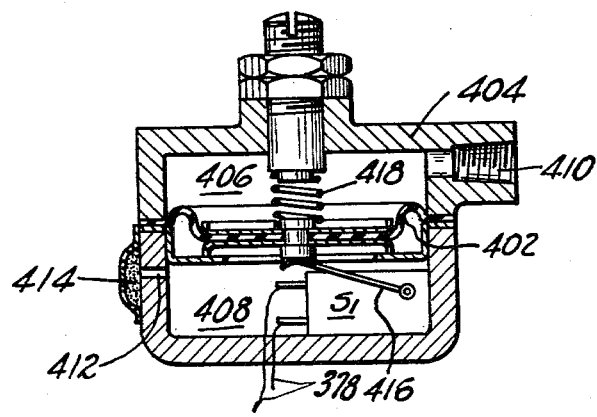
Figure 25:
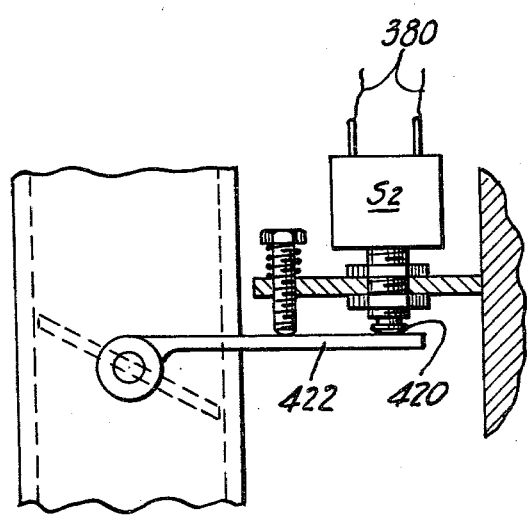

FIGURE 19 is a plan view of a rotating selection valve of the FIGURE 13 embodiment;

FIGURE 20 is a drive shaft for rotating the selection valve of FIGURE 14;

FIGURE 21 is a line graph schematically showing the conduit connection of the flow distribution device of FIGURE 13;

FIGURE 22 is a schematic line representation of the valve and port relationship of the FIGURE 13 embodiment;

FIGURE 23 is an electrical wiring diagram of a third embodiment of the present invention;

FIGURES 24 and 25 are switch actuating mechanisms for operation with the device of FIGURE 23.

FIGURE 26 is a partial section view of a modified deceleration cut-off mechanism; and FIGURE 27 is a graph showing operating characteristics of the device of FIGURE 26.

Figure 1:
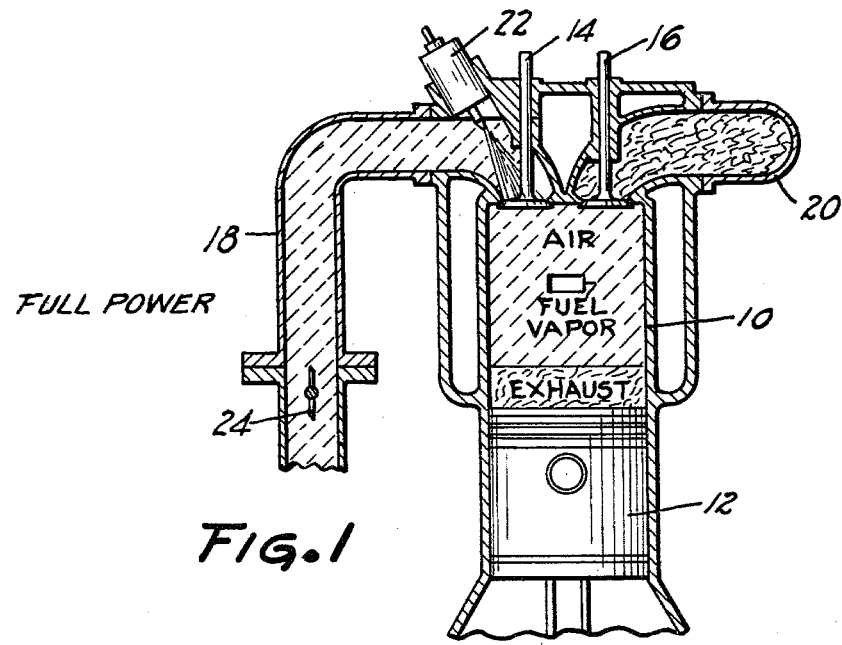
FIGURES 1 through 3 are schematic representations of the air, fuel, and exhaust gas proportion as found during the various ranges of operation of a typical internal combustion engine.
Figure 2:
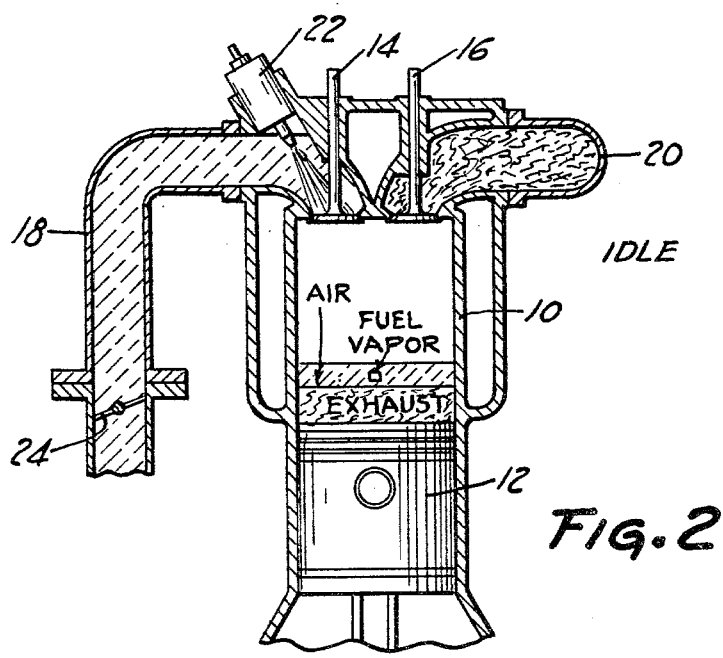
Figure 3:
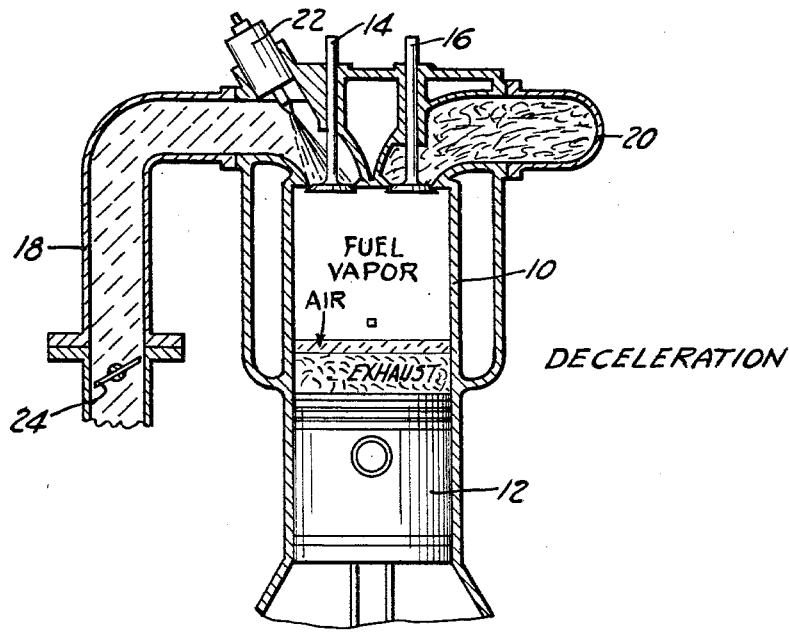

The effect of exhaust gas dilution and low air charge pressure on cylinder combustion is illustrated in FIGURES 1–3 each showing an engine cylinder 10, piston 12, intake valve 14, exhaust valve 16, intake manifold 18, exhaust manifold 20, an injection nozzle 22, and a movable throttle plate 24 disposed in the intake manifold. These figures illustrate various proportions of fuel, air, and exhaust gas in the engine cylinder at the end of the suction or intake stroke for the engine operating ranges of full power, idle, and deceleration respectively.

At full power, as represented in FIGURE 1, throttle 24 is wide open, the air and fuel charge occupy at the end of the suction stroke all the space in the cylinder vacated by the piston on its downward stroke. The space above the piston at the top of the exhaust stroke (and beginning of intake stroke) is filled with exhaust gas remaining after the previous expulsion, and this exhaust gas stays in the cylinder during the suction stroke. Of course, the air, fuel and exhaust gas will actually be mixed in the cylinder rather than separated as shown.

In order to make the engine idle, or give less than full power, it is necessary that both fuel charge and air charge be reduced by closing the throttle. FIGURE 2 shows the relative amounts of air, fuel, vapor, and exhaust gas at engine idle; the quantities illustrated as occupying the volume they would occupy at atmospheric pressure. It will be noted that the amount of exhaust gas taken into the cylinder is approximately the same as when the engine has received a full air charge (actually a slightly greater amount if there is valve overlap since some exhaust gas will enter the intake manifold). Actually, these gases would expand and fill the cylinder chamber at a pressure considerably less than atmospheric so that there is a strong vacuum when the motor is idling. The lower air pressure and larger percentage of exhaust gas when the engine is at idle results in a tendency of the mixture to burn more slowly and it is necessary to have a somewhat richer mixture. This causes a very great increase in the rate of release of uncombined hydrocarbons in the exhaust gases compared to full power operation.

The least amount of air in the cylinder, and the most unfavorable conditions for firing, are obtained when the engine is turning over at high speed with the throttle closed to the idle position when each engine cylinder has time to receive only a very small quantity of air and fuel charge. With the throttle in the idle position and at high engine speed, the pressure drop across the throttle plate exceeds a 2:1 ratio causing a limiting sonic air velocity, so that regardless of increased engine demand at higher speeds, the same air flow per unit of time passes the throttle plate as during low idle speed, thus reducing the air to exhaust gas proportion to a still greater degree at these higher speeds. This condition as shown in FIGURE 3, is reached during deceleration or on downgrade coasting. Due to the small amount of air, and very high percentage of exhaust dilution, the burning is very slow while on account of the high engine speed, there is less time for each combustion to be completed; so that incomplete combustion or misfire is apt to occur, producing a large quantity, often 500% greater than full power, of uncombined hydrocarbons in the exhaust gas.

Figure 4:
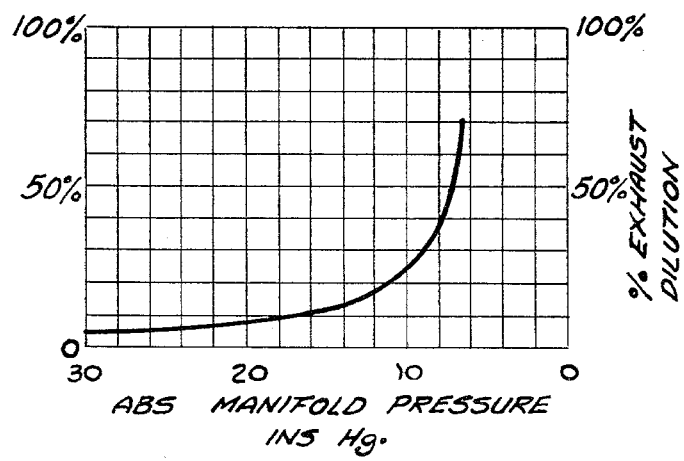
FIGURE 4 is a graph illustrating the proportion of exhaust gas dilution vs. intake manifold pressure for a typical internal combustion engine.

The percentage of exhaust gas dilution and misfiring tendency as related to intake manifold pressure is illustrated in the graph of FIGURE 4. Above approximately 15 inches of Hg manifold pressure, exhaust gas dilution has very little effect on combustion whereas at lower pressures at more closed positions of the throttle, the percentage of exhaust dilution increases rapidly as a non-linear function of manifold vacuum.

In order to overcome inefficient combustion in the deceleration and idle ranges of operation, I propose to modify fuel injection systems in two ways: first, to provide means operative during idle to interrupt the firing sequence in a planned manner so as to obtain in each given cylinder, alternate firing and purge cycles to reduce exhaust gas dilution and provide for efficient firing; and, second, to provide means to fully cut out fuel delivery during portions of the deceleration range of operation and avoid the unnecessary consumption of fuel during this engine range.

In the accompanying description I have applied means for accomplishing these objects to three distinct types of fuel injection equipment; however, it will be noted that these teachings may be equally applied to other well known direct injection fuel systems.

Referring now to FIGURES 5 through 12, there is shown a modified fuel injection system of the type described in U.S. Patent 2,897,808, W. C. Suttle, and assigned to the same assignee as the present application having a swash plate injection pump modified to include the smog inhibiting means of the present invention.

The fuel enters the control at connection flows 100 to a central fuel chamber 99, passes through the spool valve 101 through the ports 102 and 103 to the pumping chamber 104; whence it is discharged through outlet check valves 105 through connections 106 which connections are adapted to be connected to the several cylinders of the engine. A plurality of pumping chambers, one for each engine cylinder are annularly arranged in the pump body. The fuel discharge at the engine cylinder is preferably through a spring controlled nozzle (located as shown in FIGURES 1-3) into the intake valve port, or it may be delivered directly into the cylinder itself. The pumping plungers 107 are reciprocated within the pumping chambers 104 by a wobble plate 108 supported by a bracket 109 carried by and driven by drive shaft 110, which in a 4-cycle engine would be driven at one-half engine speed by means of the external spline connection 111. The angle of the wobble plate, and the resulting pumping stroke, are determined by axial movement of the sleeve 112 as operated by forked lever 113 in the manner shown in commonly assigned Patent 2,897,808. The position of the wobble plate and the extent of the pumping stroke are controlled in response to engine induction manifold pressure, engine temperature, and atmospheric pressure; in other words, the pumping stroke of the injection plunger is made a function of the cylinder air charge weight, as described in the referenced patent.

In such a system, the driver's power control element is a throttle valve 114 in the air induction pipe 115. The throttle is operated by a lever 116 connected by rod 117 to the accelerator pedal. Return closing motion of the throttle is obtained by pull of the return spring 118. Stop screw 119 serves as an adjustment for the minimum throttle opening at idle speed. Throttle actuated lever 116 includes a finger projection 120 which transmits movement through the spring loaded piston 122 operating through compression spring 123 to pivoted lever 124 to position the longitudinally movable rod 126 of my injector device. Rod 126 includes a spherical ball 128 formed at its lowermost end and which is swivably connected to the spool valve 101 through connection 130. Movable rod 126 is pinned through a lost motion slot 132 to a second movable rod 134 by means of pin 136. A pressure responsive diaphragm 138 is peripherally secured to the housing of my injector device and centrally secured to movable rod 134 and defines a sealed chamber 140 adapted for receiving intake manifold pressure via threaded connection 142. The diaphragm 138 and rod assembly 134 are urged downwardly by compression spring 144 against the stop plate 146 also peripherally secured to the housing. The upper end of rod 134 includes a ball 148 slidably received in the bore 150 in the uppermost portion of the injector housing. An externally adjustable stop member 152 is provided for limiting the upward movement of diaphragm 138.

Figures 5, 6:
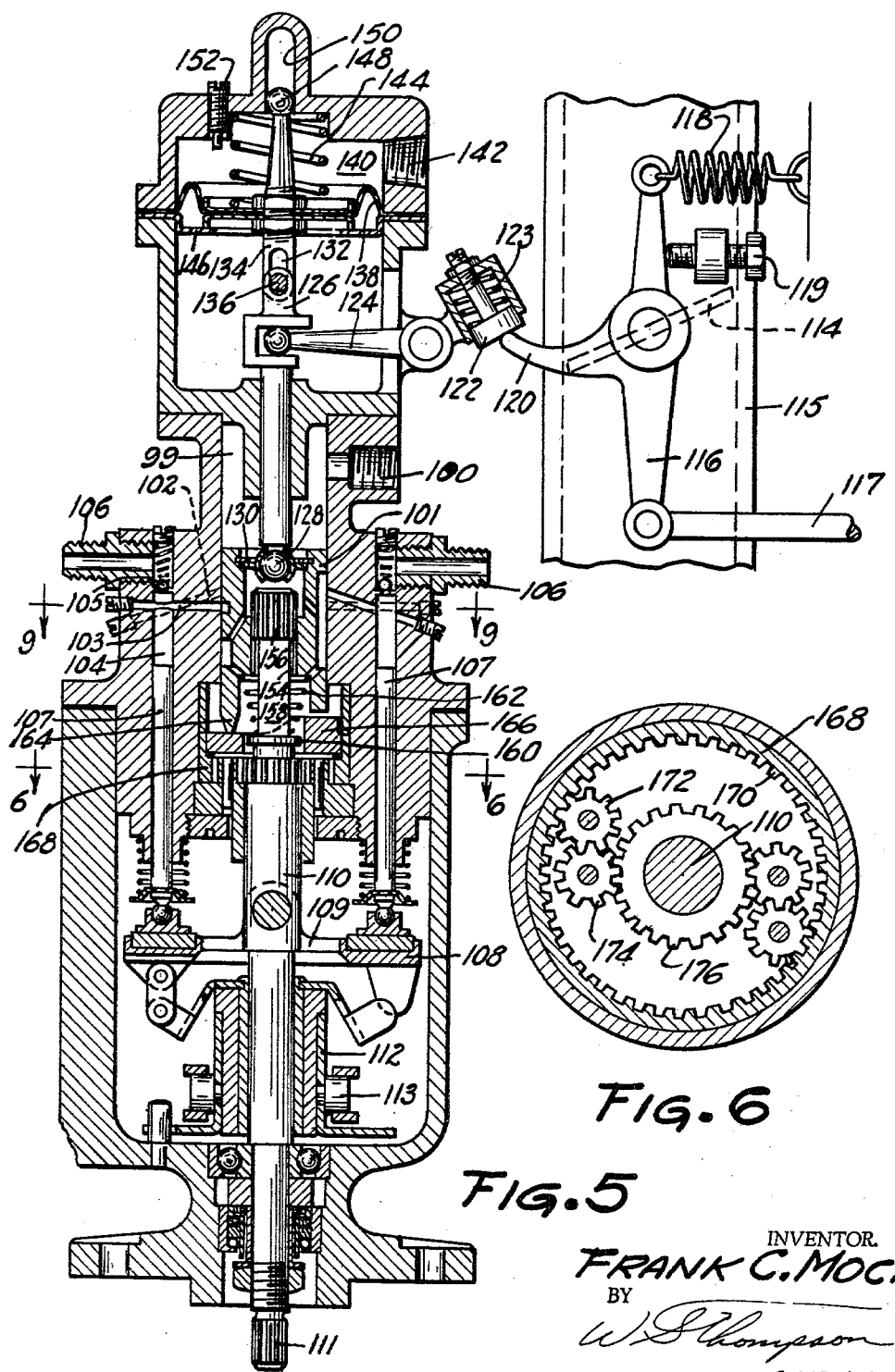
FIGURE 5 is a cross-sectional view of a combined metering and distributing fuel injection system modified to include the smog inhibiting means of the present invention.
FIGURE 6 is a section view taken along section line 6—6 of FIGURE 5 showing in greater detail a cam drive gear mechanism.

Spool valve 101 includes a splined bore 154 along its axial centerline which is engageable with the movable mating splined segment 156 secured to shaft 158 which is an extension of the main drive shaft 110 and rotates at half engine speed. Shaft 158 includes a stepped diameter portion 160 which provides an abutment for the lower end of spring 162 which bears against spool valve 101 urging the spool valve upwardly and provide a positive load on the linkage comprised of connection 130, rod 126, pivoted lever 124 and finger projections 120 of the throttle actuated lever 116. For operation of my device, the spring 118 is designed to have a greater preload and deflection rate than spring 123 which in turn is stronger than spring 162. Therefore during idle condition with the foot released from the accelerator, spring 118 will prevail, urging lever 116 against stop 119 lever 124 counterclockwise and rod 126 and spool valve 101 downwardly. Spool valve 101 includes a cam follower projection 164 on its lowermost edge which is operative to contact rotating cam 166. Cam 166 is press fitted into rotatable ring carrier 168 which includes gear teeth 170 on its inside diameter engageable with planetary pinion gears 172 and 174 having fixed shafts which are in turn driven by sun gear 176 formed on drive shaft 110. Gears 168 through 176 are best shown in FIGURE 6 and comprise a planetary gear arrangement wherein the outer ring gear 168 rotates in the same direction as the sun gear 176 at half the speed of sun gear 176 so that ring gear 168 and cam 166 rotate at one-quarter engine speed. FIGURE 11 shows a plan view looking downwardly of cam 166 and the upper edge of carrier 168. As shown in FIGURE 12, cam 166 has a high plateau section 178 and a low plateau section 180 interconnected by a harmonically contoured section 182.

The construction of spool valve 101 is best shown with reference to FIGURES 10 through 10D. Sections A and C have valve lands 184 and 186 respectively which extend circumferentially approximately 180° around the spool valve. Ports 188 are provided in the sidewall of spool valve 101 to permit the passage of inlet fuel from inlet port 100 into a recess portion 190 of the spool valve.

It will be noted that the intake ports 102 and 103, see FIGURES 5 and 9, enter the central spool valve chamber at two different levels or spaced apart planes. One intake port would be provided for each engine cylinder and are arranged circumferentially around the injector with each conduit 103 and 102 leading alternately to a successive cylinder in the engine firing order sequence as indicated by legend. In FIGURE 9 an arrangement is shown for an 8-cylinder engine wherein the conduits 103, 103', 103" and 103'" are adapted to be connected respectively to cylinders 1, 3, 5 and 7 of the engine firing sequence and intake ports 102, 102', 102" and 102'" are connected respectively to the even number cylinders 2, 4, 6 and 8. It should specifically be noted that reference is here made to the firing order of cylinder sequence and not the cylinder number as it may be assigned from its location within a group of cylinders.

*Operation—Engine idle*

It will be recalled that at engine idle it was desired to have each engine cycle alternately fire and purge between each successive operating cycle so as to eliminate the effect of exhaust gas dilution and provide for more efficient engine combustion. During the idle condition, the foot is released from the accelerator pedal allowing spring 118 to retract lever 116 clockwise. This positions lever 124 counterclockwise and moves rod 126 and spool valve 101 downwardly so that cam follower 164 engages cam 166 under pressure of spring 123. Spool valve 101 is driven at half engine speed by spline 156 and thus makes one complete revolution for the four part engine operating cycle of intake, compression, firing, and exhaust strokes which requires two engine drive shaft revolutions. Projection 164 engages the low plateau section 180 during one 4-part stroke cycle and engages high plateau section 178 during the next successive 4-part stroke cycle since cam 166 is rotating at half the speed of the spool valve. Thus for one complete cycle, spool valve 101 will ride in the position shown in FIGURE 5 blocking ports 102 and permitting fuel discharge from leads 102, 102', 102" and 102'" and for the next successive cycle it will be raised an amount sufficient to block intake ports 103 by the 180° land 186 and unblock ports 102 which will now communicate with recess portion 190 as shown in FIGURE 7. The next cycle, spool valve 101 will drop down to its former position and will continue to oscillate for each alternate engine cycle to a position which will first block passages 103 and open passages 102 and will next block passages 102 and open passages 103. Inlet fluid from port 101 passes into chamber 99 through the interior of spool valve 101 into recess 190 where it is operative to communicate with intake ports 102 and 103 when they are not blocked by the 180° lands. The 180° lands are synchronized or timed rotationally with the movement of wobble plate member 108 and pistons 107 by drive shaft 110 to block the appropriate passages 102 or 103 during the piston pumping stroke and thus prevent the return of fluid into recess 190 of the spool valve during pumping stroke. Having no other outlet, fluid will force check valve 105 open and be delivered through conduit 106 to the appropriate engine cylinder. Since spool valve 101 is directly connected with axially movable rod 126 which in turn transmits motion to lever 124, the oscillating motion (between the FIGURE 5 and 7 valve positions) will permit piston 122 to oscillate against the force of spring 123 to provide the necessary overriding motion. It will be recalled that spring 123 was constructed to have both a lower preload and spring rate than spring 118 so that motion is not transmitted to lever 116.

*Full power range*

When full power of the engine is demanded, the accelerator pedal is depressed moving lever 116 counterclockwise permitting rod 126 and spool valve 101 to move upwardly under the influence of spring 162. The rod and spool valve assembly will continue to move upwardly until pin 136 abuts the upper end of slot 132 formed in the second movable rod 134. In this connection, spring 144 has a considerably higher spring load than does spring 162 and thus positively abuts against the stop plate 146. Under this condition land 186 of spool valve 101 will cover both intake ports 102 and 103 so as to permit firing of all the engine cylinders in their normal order to permit development of the necessary engine power.

*Deceleration range*

If while cruising at full power the foot is suddenly withdrawn from the accelerator pedal so as to permit throttle plate 114 and lever 116 to return clockwise to stop 119, this action normally would cause spool valve 101 to return to its idle position against cam 166. However, due to the high engine speed and the fact that throttle plate 114 is in its most closed position, manifold vacuum will achieve a very high value (high vacuum-low absolute pressure) sufficient to urge diaphragm 138 upwardly against the influence of spring 144 which collapses. As diaphragm 138 and rod 134 snap upwardly the lower end of slot 132 engages pin 136 and withdraws rod 126 upwardly which also compresses spring 123 acting on piston 122. The spool 101 and rod 126 will then stabilize in a position, as illustrated in FIGURE 8, wherein both ports 102 and 103 open into the recess 190 of the spool valve and thus no fuel delivery to the engine occurs causing a complete cut-off of fuel and the avoidance of any hydrocarbon formation. As the engine continues to decelerate, the cylinder pumping action will grow gradually less decreasing the manifold vacuum or increasing the manifold pressure until a point is reached wherein the pressure differential across diaphragm 138 is no longer sufficient to overcome the force of spring 144 (also spring 123) and rod 126 and spool valve 101 are again dropped to their idle position against cam 166. The size of diaphragm 138 and the preload of spring 144 should be selected, preferably, to return the spool valve 101 to its idle position slightly before idle speed is obtained to provide for advance refiring of the pistons and avoid the possibility of engine stall and also to provide a rapid change in position (snap action) into and out of full cut-off to avoid an inefficient firing transition zone.

With respect to the function of cutting out the fuel entirely during deceleration, efforts have proven unsatisfactory in the past when applied to carburetors because of a lag in the metering of fuel by the carburetor to the time the fuel air charge is supplied to an engine cylinder. This causes the engine to continue firing for a time after fuel is cut off and to stall at idle. Stalling at idle is particularly pronounced when the coasting down time is appreciable thus giving the combustion chamber time to cool. With the present invention, however, these conditions are avoided since direct injection of fuel into the engine cylinder or immediately upstream of the intake valve prevents any appreciable time lag between fuel cut off and the interruption of fuel at the cylinder, and further the device may be readily adjusted so that as idle is approached, the cylinders are gradually cut in on an alternate firing basis to prevent an idle stall. Also by providing a rapid transition into and out of cut-off, a transition zone of poor burning is avoided. If desired, the speed of cut-off may be accelerated to a still further degree by the modified cut-off mechanism shown in FIGURE 26.

Referring to FIGURE 26, parts similar to those of FIGURE 5 are identified by reference numerals having the same last two digits. A fixed size bleed or orifice restriction 452 is placed in conduit 442 which communicates with vacuum in the intake manifold. A second smaller bleed 454 is formed in the housing sidewall to provide limited communication with the atmosphere. The two bleeds 454 and 452 are in series so that the vacuum in chamber 440 is a selected percentage of the difference between atmospheric pressure and intake manifold vacuum. A passage 456 is formed in the housing in parallel with restriction 452 and terminates at 458 into bore 450. Ball 448 of rod 434 is made smaller than comparable ball 148 of FIGURE 5, and a cylindrical air valve 460 is fitted over the ball and is slidable in bore 450 with movement of rod 434. In the down position, as illustrated, valve 460 blocks parallel passage 456 so that the vacuum in chamber 440 is a predetermined low percentage of manifold vacuum. On upward movement a point will be reached where valve 460 begins to unblock passage 456 by passing restriction 452 causing the vacuum in chamber 440 to increase. The increase of manifold vacuum causes a greater upward positive pressure differential on diaphragm 438 urging rod 434 and valve 460 still further upwardly. The unblocking of passage 456 thus induces a step change in vacuum in chamber 440 causing a snap upward action initiating prompt cut-off. As manifold vacuum decreases as by slowing down of the engine, valve 460 will gradually move downward until valve 460 begins to block passage 456 at which time the chamber vacuum will fall and the diaphragm assembly will snap downwardly against stop plate 446. The operating characteristics of this mechanism are as shown in the graph of FIGURE 27 wherein the travel of rod 434 (also valve 460) is plotted vs. manifold vacuum.

In the range from A–B vacuum in chamber 440 is insufficient to move the assembly off from stop plate 446. At the point B the pressure differential across diaphragm 438 is sufficient to overcome the spring preload and move valve 460 upwardly. Valve 460 will move upwardly from B to C proportionately with vacuum increase until at the point C passage 460 is unblocked causing a step change or increase in vacuum in chamber 440. The step increase causes the assembly to snap rapidly upward to the point D where valve 460 abuts the end of bore 450. On decreasing manifold vacuum as when engine speed decreases there will be no movement from D to E since the assembly was firmly held against the end of bore 450 by an excess of force. At the point E vacuum has decreased sufficiently to permit spring 444 to become effective in urging diaphragm 438 and rod 434 downwardly proportionate to vacuum decrease. The diaphragm and rod assembly continue to move downwardly to the point F, where valve 460 again begins blocking passage 456 dropping the vacuum in chamber 440 causing the diaphragm and rod assembly to snap down against plate 446 as represented by the point G. The spring loads and port dimensions are selected so that curve portion C–D coincides with the desired point of fuel cut-off which would occur at a high manifold vacuum, perhaps 20–22 inches Hg which occurs with throttle plate closed in the idle position and the engine at high speed. Curve portion F–G is selected to return out of cut-off before idle speed is obtained even though the throttle plate still remains closed.

It should be further noted that two effects are obtained by alternately firing a given engine cylinder during the idle condition of operation. First, the cylinder alternately fires and purges thus removing the exhaust gas dilution and providing for more efficient combustion. Secondly, the throttle plate must be set in a position to pass susbtantially twice the quantity of air necessary for a given power output since half this air quantity is utilized in the non-firing purging operation. This more wide open setting of the throttle plate reduces the idle manifold vacuum so that operation occurs at a more favorable point on the curve shown in FIGURE 4.

Referring now to FIGURES 13 through 17, there is shown a second embodiment of my invention as applied to a distributing valve capable of use with a pre-metered fuel discharge such as may be supplied by an injection carburetor of the type illustrated in my Patent 2,546,901. In the second form of my invention, it will be noted that the throttle and intake manifold assembly are identical to that shown in the first embodiment, and many of the parts of the distributor valve arrangement correspond to similar parts of the fuel metering distributing apparatus of the first embodiment. Similar parts bear the same numerical designation as in the FIGURE 1 embodiment with the prime suffix added. In this embodiment, however, the fuel supply to inlet conduit 100′ is pre-metered fuel as contrasted with the unmetered fuel of the FIGURE 1 embodiment. Spool valve 101 is replaced by a selector valve 201 shown in FIGURES 13 and 19 which contains a transverse distributing port 204 in the sidewall thereof and a pair of milled slots 206 projecting upwardly from the bottom edge. A bifurcated drive quill 208, FIGURE 20, including projections 210 which are adapted to be received in slots 206 of the selector valve is to be driven at one-quarter engine speed so that for a 4-part cycle engine, one-half revolution of drive shaft 208 and selector valve 201 occurs or conversely stated; one revolution of shaft 208 and valve 201 for two complete cycles or four engine drive shaft revolutions. The distributor includes a spool valve casing 212, FIGURES 13 and 15, formed with a multiplicity of grooves 214, one groove being assigned to each cylinder lead such as for example outlet conduit 106′ which may lead to the No. 1 cylinder. The next successive lower groove may have an outlet port, see FIGURE 14 section view, which leads to No. 2 cylinder etc. Each groove 214 connects with two vertical passages 216 and 218 respectively which are drilled vertically down through the body of casing 212 where they connect with the short radial passages 220 and 222 respectively opening inwardly in communication with selector valve 201. Each annular groove will have one opening 220 arranged circumferentially around selector valve 201 at a lower level or plane as indicated in the drawings, and each annular groove will contain a second passage 222 arranged circumferentially around the selector valve at a higher level as indicated by port 222, FIGURES 16 and 17. For a firing sequence of 1, 2, 3, 4, 5, 6, 7 and 8 in an 8-cylinder engine, the ports at each level will be arranged on an alternate firing basis; that is, at the lower level sweeping circumferentially the ports encountered would be for cylinders 1, 3, 5, 7, 2, 4, 6 and 8 whereas the sequence of ports on the upper level would be 2, 4, 6, 8, 1, 3, 5 and 7. During the idle range of operation with lever 116′ and throttle plate 114′ in the idle position, rod 126′ has moved downwardly against the action of spring 162′ so that distributing port 204 and selector valve 201 will communicate only with the lower level of ports 220, see idle port position in FIGURE 22. During this idle range of operation, the selector valve 201 will revolve 180° for one cycle of engine operation during which time it will successively encounter alternate cylinders in the firing order in the order mentioned above. If now full power is required, the accelerator pedal is depressed moving lever 116′ clockwise, rod 126′ will move upwardly under the influence of spring 162′ until pin 136′ abuts against the upper edge of slot 132′ at which time the selector port 204 will encompass both upper and lower levels or planes of ports 220 and 222 so that fuel is supplied to the engine in its normal firing sequence. In this connection, it will be noted that the ports 220 and 222 are arranged so that two alternate firing cycles are superimposed on one another thus providing a uniform firing sequence. This operation is schematically shown in FIGURES 17 and 18 wherein the idle position would merely sweep the lower level of ports during two complete engine firing cycles whereas when the port moves upwardly so as to encompass both upper and lower levels, the fuel will be supplied by the summation of ports shown in FIGURE 18 also normal position of FIGURE 22. FIGURE 21 is a schematic representation or line drawing of the port connection in selector valve sleeve 212. Each of the horizontal lines numbered 1 through 8 represent one of the 8 annular grooves 214 whereas the vertical lines leading to the lower level of ports represent vertical conduits 216 and the vertical lines connecting the higher level of ports represent vertical conduits 218. During high speed decelerations, diaphragm 138′ acts in the same manner as previously described with the high manifold vacuum in chamber 140' urging the diaphragm upwardly against the action of spring 144' which through movable rod 134' retracts selector valve 201 upwardly so that distributing port 204 no longer contacts either the lower or upper level of ports, as shown schematically in FIGURE 22 for the cut-off position. As engine deceleration proceeds, and the manifold vacuum gradually falls to the point where spring 144' predominates, selector valve 201 will again be repositioned to its idle position causing alternate cylinder firing.

FIGURES 23 through 25 represent a third embodiment of my invention as applied to an electrical pulse timed injector system, as for example of the type described in U.S. Patent 2,893,370 in the name of A. H. Winkler and assigned to a common asignee with the present application.

Referring to FIGURE 23, there is shown a series of injector valves 301 through 308, the last digit of said numerals designating its normal fuel delivery sequence order, which are adapted to be periodically opened for a controlled time duration by an electrical pulse supplied to solenoids 310. The mechanism for controlling the pulse timing and duration is comprised of an electronic control generally designated by numeral 332, a pulse triggering switch or distrbutor points 335 and a pulse distributing device generally designated as 334, distributor points 335 are to be driven in the conventional manner at one-half engine speed making eight contacts per 4-part engine cycle whereas distributing device 334 is driven at ¼ engine speed.

Within the electronic control, the variable resistances designated $R_1$ and $R_2$ have variable position wiper arms adapted to be controlled as a function of engine control parameters such as manifold pressure, throttle position, engine temperature or the like to control the duration of the time pulse and thus quantity of fuel delivery as described in the referenced Patent 2,893,370 or in response to other well known parameters in the art. A source of power E is connected through a switch 330 and lead 333 to a triggering or distributor switch 335 which may be conventional distributing points used in multi-cylinder internal combustion engnes. One contact of triggering switch 335 is connected to a lead 333 by conductor 338. The other contact of triggering switch 335 is connected to ground or reference potential by a conductor 340. Triggering switch 335 is adapted to be periodically closed as a function of engine speed. The actuation of switch 335 produces a series of pulses in lead 342 substantially as shown in FIGURE 23. Each of these pulses is subsequently transformed into a pair of negative and positive voltage spikes by a capacitor 344. A rectifier 346 connected to capacitor 344 passes the negative spikes only to the base 348 of a normally non-conducting transistor 350 of a monostable multi-vibrator designated generally at 352. The collector 354 of transistor 350 is connected to the base 356 of a normally conducting transistor 358 of multi-vibrator 352 through lead 360 and the capacitor C. When the negative voltage spike is applied to the base 348, transistor 350 commences to conduct whereby the potential in lead 360 is increased sufficiently to drive transistor 358 into a non-conducting state. The time that transistor 358 remains non-conductive is determined by the decay rate of capacitor C which in turn is a function of the value of the time constant $R_1R_2C$. When the voltage on capacitor C as applied to the base 356 reaches a predetermined value, transistor 358 again becomes conductive and transistor 350 is rendered non-conductive. Transistor 350 remains non-conductive until retriggered by a negative voltage spike. The action of the multi-vibrator 352 produces a pulse in the output lead 362 the width or time duration of which is controlled as a function of the time constant $R_1R_2C$. The amplitude of the pulse in lead 362 varies from a normally conducting voltage $E_1$ to substantially zero. The output of the multi-vibrator 352 is coupled to amplifier 372 through lead 362, capacitor 366 and lead 368. A diode 370 clamps lead 368 to lead 333 to insure a substantially constant steady state voltage E in lead 368 with reference to the voltage in lead 333. A pulse in lead 362 produces a pulse in lead 368 of substantially the same width as the pulse in lead 362. The amplitude of the pulse in lead 368 varies from the reference voltage E to the lower voltage $E_2$.

The pulse in lead 368 causes transistor 372 to conduct. The time the transistor 372 conducts is determined by the duration of the pulse in lead 368 which in turn is determined as a function of the time constant $R_1R_2C$. The output of the transistor 372 is amplified by cascaded transistors 374 and 376. The output of power amplifier 376 is conducted by the lead 378 through switch $S_1$ and is applied in parallel to the two leads 380 and 382 of the distributing mechanism. Lead 380 includes a second switch $S_2$. The distributing mechanism includes two concentric commutator rings 384 and 386 respectively connected to the leads 380 and 382. A wiper arm 388 is mounted on shaft 336 which is driven at one-quarter engine speed and includes two wiper segments 390 and 392 at the opposite ends thereof which contact circumferentially disposed contact segments 394 at the outer periphery of the distributing device. Wiper segment 390 contacts commutator ring 386 whereas wiper segment 392 contacts the inner commutator ring 384. The contact segments 394 are respectively connected to the solenoids 310 to operate the injector valves 301 through 308.

During normal power operation, switches $S_1$ and $S_2$ are closed so that time pulses in lead 378 are transmitted to both commutator rings 384 and 386. With pulses supplied to both commutator rings, electrical solenoid pulses will be supplied in the normal firing order, for example, a time pulse will first be supplied by commutator ring 386 through wiper segment 390 to the contact segment leading to the first injector nozzle 301 in the firing order sequence. As wiper arm 388 rotates, wiper contact 392 will next be operative to contact the segment supplying the electrical impulse to the second nozzle 302 in the firing order sequence etc.

During idle operation, switch $S_2$ is opened, interrupting contact to the inner commutator ring 384 thus inactivating wiper segment 392. Now as the wiper arm rotates, wiper segment 390 only will be operative and will contact segments 394 in an alternate firing sequence, providing one firing cycle and one purge cycle in accordance with the teachings of the present invention.

When full cut-off is desired as during deceleration, switch $S_1$ is actuated and moved to an open position interrupting the electrical impulse to both commutator rings 384 and 386 and thus inactivating both wiper segments 390 and 392.

Referring to FIGURE 24, there is shown a manifold pressure responsive diaphragm 402 peripherally secured within a housing 404 to define two chambers therein 406 and 408 respectively. An inlet port 410 is adapted to be connected to the engine manifold for supplying manifold vacuum to chamber 406. Chamber 408 contains atmospheric pressure communicating through port 412 and dust packing 414. Switch $S_1$ as previously described with reference to FIGURE 23, may be included within chamber 408 and includes a lever actuating member 416 abutting the underside of diaphragm 402. As manifold vacuum increases, or the absolute manifold pressure decreases as during deceleration, a pressure differential across diaphragm 402 is created in an upward direction moving the diaphragm against the influence of spring 418. This causes lever 416 of switch $S_1$ to move clockwise and breaking contact in lead 378.

Thus as with the previous embodiments, high manifold vacuum is operative to interrupt the fuel supply during deceleration or downgrade coasting to thus prevent the unnecessary engine firing and misrange of operation.

In FIGURE 25, switch $S_2$ is shown and may comprise a simple button contact 420 actuated by an arm 422 when the engine throttle plate is placed in its idle position. Switch S₂ would be normally closed when button 420 is not depressed and would be actuated in an open position to disrupt the flow of electricity through conduit 380 when depressed.

Although particular embodiments of my invention have been described, it will be understood by those skilled in the art that the objects of the invention may be obtained by the use of constructions different in certain respects than those disclosed without departing from the underlying principles of the invention.

I claim:

1. A fuel injector system for a multi-cylinder internal combustion engine comprising: a fuel source; an engine driven swash plate injection pump having a plurality of annularly arranged spaced apart pumping chambers and pumping pistons therein, one for each engine cylinder; wall means defining a cylindrical chamber centrally of said injection pump connected to said fuel source for receiving inlet fuel; a first group of radially disposed passages formed in said wall means opening on one end into said central chamber in a first common transverse plane; and connecting on the other end to separate and alternate pumping chambers; a second group of radially disposed passages formed in said wall means opening on one end into said central chamber in a second common transverse plane spaced from said first plane and connecting on the other end to separate pumping chambers intermediate the chambers connected by said first group of passages; a spool valve driven synchronously with said swash plate disposed in said central chamber operative in a first position to selectively block said first group of passages in timed relation with the respective piston pumping stroke to enable fuel delivery and operative in a second position to selectively block said second group of passages in timed relation with respective piston pumping stroke; and cam means driven at one-half the spool valve speed operative to position said spool valve alternately between first and second positions.

2. A fuel injector system as claimed in claim 1 wherein said spool valve includes land means operative in a third position of said spool valve to selectively block both said first and second group of passages in timed relation to piston pumping stroke and thereby deliver fuel for each engine firing stroke.

3. A fuel injector system as claimed in claim 1 including means responsive to intake manifold vacuum operative to position said spool valve in response to high vacuum in a fourth position wherein neither group of passages are selectively blocked and fuel delivery is prevented.

4. A fuel injector system as claimed in claim 3 wherein said means responsive to intake manifold is comprised of a spring loaded diaphragm operative to rapidly position said spool valve into said fourth position on attaining a predetermined manifold vacuum.

References Cited by the Examiner
UNITED STATES PATENTS

| | | | |
|---|---|---|---|
| 2,180,109 | 11/39 | High | 123—139 |
| 2,232,841 | 2/41 | Dickson | 123—198 |
| 2,444,440 | 7/48 | Grieshaber et al. | 123—198 |
| 2,771,867 | 11/56 | Peras | 123—198 |
| 2,884,918 | 5/59 | Klug | 123—139 |

RICHARD B. WILKINSON, *Primary Examiner.*